United States Patent Office 2,759,458
Patented Aug. 21, 1956

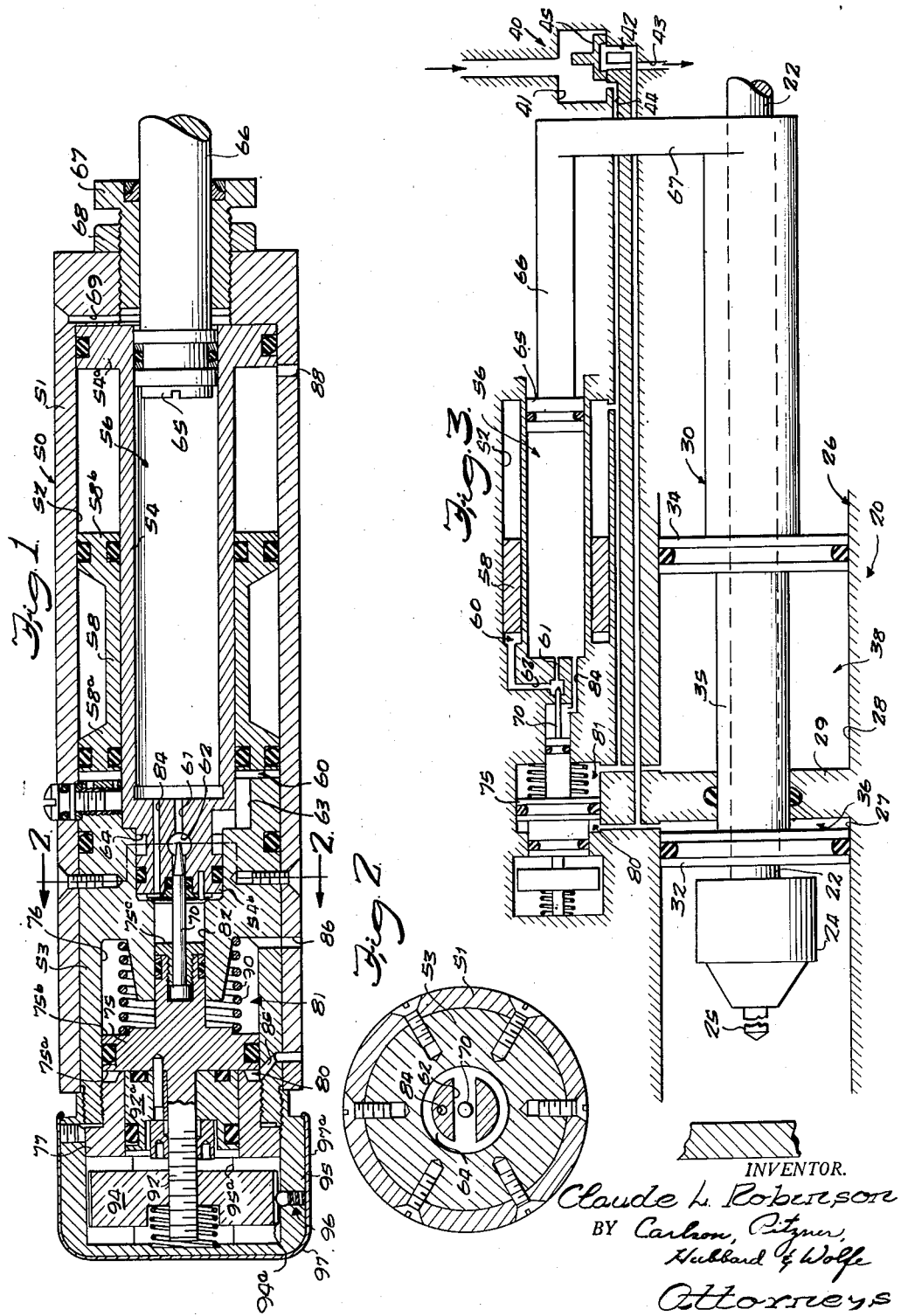

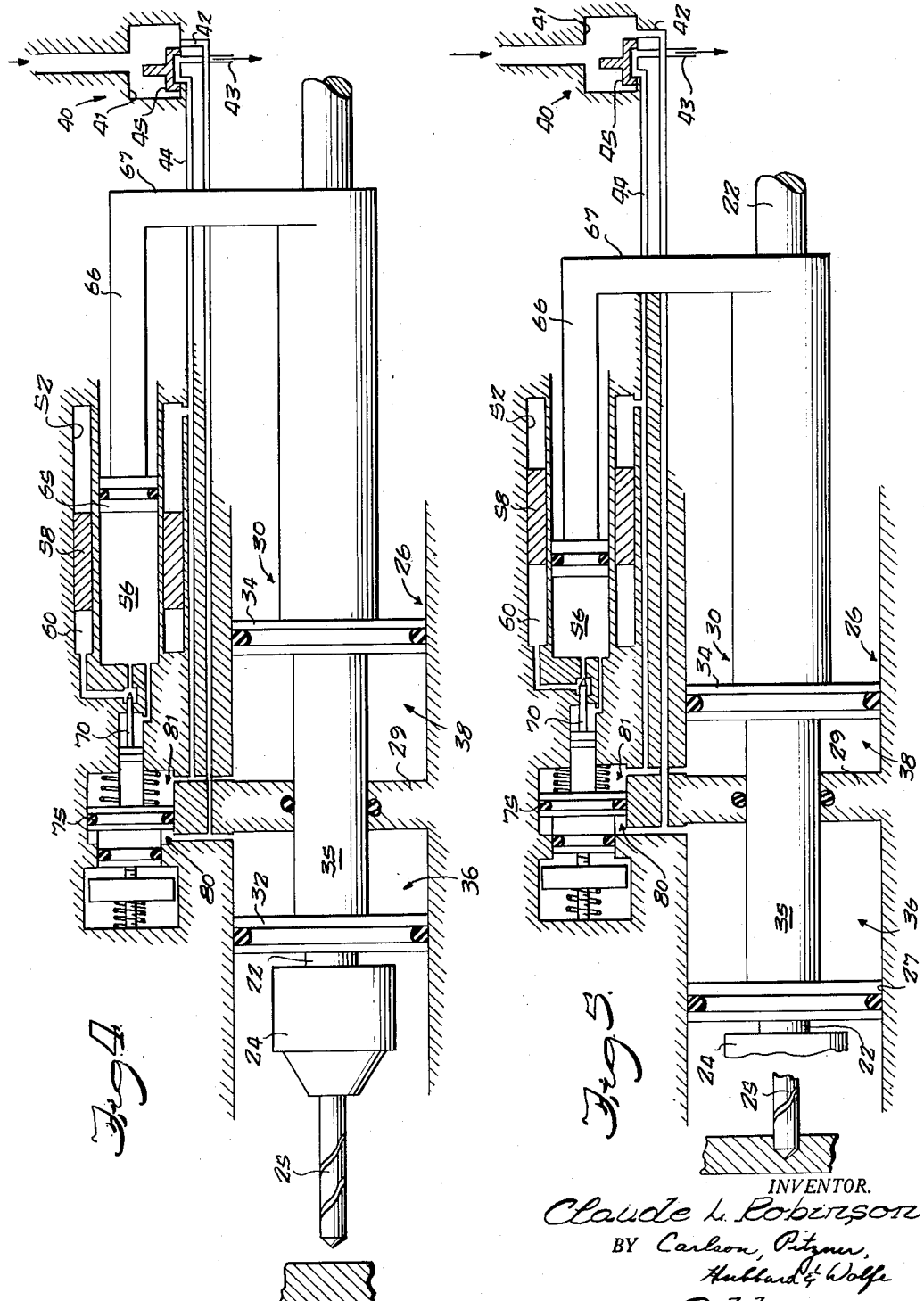

2,759,458

FEED CONTROL DEVICE FOR POWER OPERATED TOOLS WITH PRESSURE FLUID FEED

Claude L. Robinson, Spring Lake, Mich., assignor to Gardner-Denver Company, Quincy, Ill., a corporation of Delaware Application February 24, 1955, Serial No. 490,392

6 Claims. (Cl. 121—45)

The present invention relates generally to power operated tools and has particular reference to the control of longitudinal movements imparted to the spindle of the tool.

It is a general object of the invention to provide in a tool embodying a power actuated spindle and means for advancing and retracting the spindle, an improved construction and arrangement for controlling the rate of longitudinal movement of the spindle with respect to a workpiece.

A more particular object of the invention is to provide in a power operated tool longitudinal movement rate control means effective to adjust the rate of longitudinal movement of the spindle of the tool in accordance with the amount of resistance to such movement encountered by the tool.

A more detailed object is to provide control means in a tool of the aforementioned character for automatically adjusting the rate of longitudinal movement of the spindle of the tool for effecting a rapid approach of the tool toward the work, a forward feeding movement thereof upon engagement of a tool element carried by the tool with the work which forward feeding movement is coordinated with the amount of resistance to such movement offered by the work, and to permit return movement at a rapid rate upon withdrawing the tool element from the work.

The objects of the invention thus generally set forth, together with other objects and ancillary advantages are attained by the construction and arrangement shown by way of illustration in the accompanying drawings, in which:

Figure 1 is a central longitudinal section through a control device embodying the features of the present invention.

Fig. 2 is a transverse section taken in offset planes substantially as indicated by the line 2—2 in Fig. 1.

Figs. 3, 4 and 5 are diagrammatic respresentations of the illustrative control device in use with a power operated drilling machine and respectively indicating various relative component relationships under different operating conditions of the tool.

While the invention is susceptible of various modifications and alternative constructions, there is shown in the drawings and will herein be described in detail a preferred embodiment. It is to be understood, however, that it is not thereby intended to limit the invention to the specific form disclosed. On the contrary, it is intended to cover all modifications and alternative constructions falling within the spirit and scope of the invention as expressed in the appended claims.

Referring more particularly to the drawings the form of the invention there shown for purposes of illustration is adapted for use with a tool 20 of the type adapted for operation by pressure fluid such as compressed air. Such a tool 20, as is diagrammatically indicated in Figs. 3, 4 and 5, incorporates a rotatably driven spindle 22 which mounts a chuck 24 for carrying a tool element 25 such, for example, as a drill. The spindle 22 is reciprocable in a stationary housing 26 which may be of generally tubular form defining a feed cylinder 27 and a return cylinder 28, the two cylinders being arranged in longitudinally spaced, coaxial relation and being separated by a transverse partition 29. Slidably disposed within the cylinders is a feed and return piston assembly generally designated 30. The feed and return piston assembly 30 includes a feed piston 32 which is disposed within the feed cylinder 27. Within the return cylinder 28 is disposed a return piston 34. The two pistons are maintained in rigid spaced relation by means of a rod 35 which extends through the partition 29. The feed piston, the cylinder portion 27 of the housing 26, and the partition 29 define a feed chamber 36 to which pressure fluid is admitted for advancing the piston assembly and with it the spindle 22 and chuck 24. Similarly the return piston 34, the cylinder portion 28 of the housing 26, and the partition 29 define a return pressure chamber 38 to which pressure fluid is admitted to retract the piston assembly and thus retract the spindle, the chuck and a tool element carried thereby. While not shown in the drawings, tools of the illustrative type usually include a motor for rotating the spindle, chuck and a tool element mounted therein.

Pressure fluid, such as compressed air, is admitted to the instant tool by way of a control valve assembly which includes a direction control valve diagrammatically indicated at 40. The control valve includes an inlet chamber 41 to which pressure fluid is supplied from any suitable source (not shown). Communicating with the inlet chamber 41 are three passages respectively indicated at 42, 43 and 44. The three passages are arranged longitudinally along one wall of the inlet chamber 41 and respectively communicate with the feed piston chamber 36, the atmosphere and the return piston chamber 38. Communication between the inlet chamber and the passages 42 and 44 and between such passages and the atmosphere, by way of the passage 43, is under the control of a shiftable valving element 45. Thus the valving element has two positions which for convenience may be referred to as "feed" and "return" positions. With the valving element 45 in the return position, as shown in Fig. 3, communication is established between the inlet chamber 41 and the return piston chamber 38 by way of the passage 44 so that live pressure fluid is supplied to the return piston chamber to effect rearward or withdrawal movement of the piston assembly, spindle and chuck. At the same time communication between the feed piston chamber 36 and the atmosphere is established by way of the lines 42 and 43 so as to permit exhaust of fluid trapped in the feed piston chamber during withdrawal movement of the piston assembly. In Figs. 4 and 5 the valving element 45 is shown in feed position so that live pressure fluid is supplied to the feed piston chamber 36, and the return piston chamber 38 is connected to the atmosphere to permit the exhaust thereof.

The components of the illustrative tool thus far described form no part of the present invention. They have been described here only to establish an operative environment for the present invention. For details of a tool embodying a construction similar to that described above, reference is made to the copending application of Walter C. Chaffee and Claude L. Robinson, Serial Number 473,662, filed December 7, 1954.

In carrying out the present invention, means is provided for controlling the rate of longitudinal movement of the illustrative tool in accordance with the resistance encountered by the tool to such movement. More particularly, when forward movement of the tool is to be effected, it is desirable that such movement take place at a rapid rate until such time as a tool element such as a drill carried thereby engages a workpiece.

Upon completion of the drilling operation or at any other time that the tool is withdrawn from the work it is desirable that such return movement be effective at a rapid rate. These rapid advance and return rates serve to minimize the non-working time of the tool.

When the tool element is in engagement with the workpiece forward movement of the tool is effected at what is commonly referred to as "slow feed" or the feed rate. It will be apparent to one skilled in the art that with soft materials such as light metals, wood, mild steel, etc., drilling can be effected at rates substantially higher than those during drilling on harder or tougher materials such, for example, as hardened steels and alloys of various degrees of hardness and toughness. Furthermore, in some materials, such, for example, as in laminates or armor plate, so-called "hard spots" are frequently encountered. The present invention contemplates the provision of a feed rate control means which automatically correlates the feed rate to the resistance to longitudinal movement encountered by a tool element at any time during operation upon a workpiece. More particularly, the instant invention contemplates the provision of a feed rate control device which permits rapid forward movement prior to engagement of a tool element with the work and movement at a similar rapid rate upon withdrawal of the tool element, and when the tool element is in engagement with the workpiece, a feed rate control device embodying the instant invention is effective to sense the resistance to forward movement and to automatically adjust itself so as to correlate forward feeding movement with such resistance.

The illustrative feed rate control device includes a pair of variable volume fluid chambers together with means for regulating the rate of fluid flow therebetween, wherein the volume of the fluid chambers is determined by the position of the tool element whose movement is being controlled and the rate of flow of fluid between the chambers is coordinated with the amount of resistance encountered in the movement of the tool element being controlled.

Referring more particularly to Fig. 1 of the drawings, there shown for purposes of illustration is a feed rate control device, generally designated 50, embodying the features of the present invention. The illustrative device is of cartridge-like form and is adapted for mounting in longitudinally alined relation upon the tool housing 26. As shown, the device 50 includes a cylindrical housing 51, having a bore 52 which is closed at its forward end by a cylindrical plug 53. Coaxially disposed within the bore 52 is a tubular member 54 having an external flange 54a at its rear end to support the rear end thereof within the housing bore 52. The forward end of the member 52 terminates in a cylindrical portion 54b of reduced diameter which is received in a complemental bore formed coaxially in the plug 53. The tubular member 54 serves to define a coaxially disposed internal cylindrical chamber 56, the forward end of which is closed by the end portion 54b of the member 54.

Longitudinally movable upon the tubular member 54 is a dual piston 58 which is of annular form having piston heads 58a and 58b respectively facing forwardly and rearwardly within the housing bore 52. It will be seen from Fig. 1 that the housing 50, the piston head 58a, the tubular member 54, and the plug 53 define a chamber 60 for the reception of hydraulic fluid. Similarly, the chamber 56 within the tubular member 54 is adapted to receive hydraulic fluid. Communication between the two chambers is afforded by way of intersecting passages 61 and 62 formed in the portion 54b of the tubular member 54, a port 63 formed in the plug 53 and an annular channel 64 formed adjacent the inner end of the reduced end portion 54b of the tubular member 54.

In order to control the rate of longitudinal movement of the piston assembly 30 of the tool 20, the piston assembly 30 is adapted for connection to hydraulic piston 65 for movement therewith, which hydraulic piston is disposed within the chamber 56. Thus, the hydraulic piston is mounted upon a piston rod 66 which is adapted to be rigidly connected to the piston assembly 30 by means of a cross arm 67. Longitudinal movement of the piston 65 and rod 66 is guided by a sleeve 67 which is externally threaded for reception in a complementally threaded bore formed in the rear end of the housing 51 and is adapted to be locked in place by means of a lock nut 68. The space between the inner end of the sleeve 67 and the rear face of the piston 65 is vented by a port 69 formed in the housing 51.

It will be apparent therefore that the application of live pressure fluid from the inlet chamber 41 of the direction control valve 40 to the feed chamber 36 by way of the passage 42 produces forward movement of the piston assembly 30 and with it, by virtue of the connection afforded by the cross arm 67, the piston rod 66 and the piston 65. Such forward movement of the piston 65 reduces the volume of the chamber 56 and forces hydraulic fluid therefrom into the chamber 60 by way of the port 63 and the passages 62 and 61. This transfer of fluid into the chamber 60 causes rearward movement of the piston 58 thereby increasing the volume of the chamber 60 to accommodate the hydraulic fluid as it is forced from the chamber 56. The rate of forward movement of the piston assembly 30 and with it the chuck 24 and the tool element 25 mounted therein is therefore determined by the rate of fluid transfer from the chamber 56 to the chamber 60.

In order to control this rate of movement means is provided to regulate fluid flow through the port and passage system 63, 64, 62, 61. For this purpose the illustrative control device incorporates a needle valve 70 which is mounted for longitudinal movement into and out of the portion 54b of the member 54 toward and away from the forward end of the passage 61 through the intersection therewith of the transverse passage 62. It will be seen, therefore, that the tapered forward end of the needle valve 70 serves to control the rate of fluid transfer through the passage system 61, 62, 64, 63 between the hydraulic fluid chambers 56 and 60.

In accordance with the present invention means is provided to correlate the position of the needle valve 70 with the resistance to movement encountered by the longitudinally movable elements of the tool 26, the control of the rate of movement of which is to be effected by the control device 50. More particularly, during forward movement of the piston assembly 30, chuck 24, and tool element 25, prior to engagement of the tool element with a workpiece and during rearward movement of these components as upon withdrawal of the tool element, it is desirable that such movement take place at a rapid rate. Under such conditions the needle valve 70 is moved forwardly so as to reduce the metering effect thereof on fluid flow through the passage system 61, 62, 64, 63. However, upon engagement of the tool element 25 with the work, the needle valve 70 is moved rearwardly so as to restrict fluid flow through the passage system. Under such conditions of operation the needle valve 70 is positioned in accordance with the amount of resistance to forward feeding movement encountered by the tool element 25.

It will be apparent that during forward movement of the piston assembly 30, when the tool element 25 engages the workpiece there is an increase in the resistance to its forward movement and correspondingly there is an increase in fluid pressure in the feed chamber 36, a decrease in fluid pressure in the return chamber 38, and a decrease in fluid pressure in the hydraulic chamber 56. Similarly, if the tool element completes the drilling operation through a workpiece the resistance to forward movement decreases, and this results in a decrease in fluid pressure in the feed chamber 36 and an increase in fluid pressure in the chambers 38 and 56. The present invention contemplates utilization of these pressure changes to control the position of the needle valve 70. For this purpose the illustrative control device includes a differential piston 75 which is connected to the needle valve 70 for moving the same and which includes working areas which are acted upon by fluid pressures corresponding to those in the chambers 36, 38 and 56.

Referring particularly to Fig. 1 of the drawings, it will be seen that the illustrative feed control device includes a piston 75 having a forward face 75A, a rear face 75B, and an auxiliary rear face 75C. The piston 75 is reciprocable in a bore 76 formed in the forward end of the plug 53. The forward end of the bore 76 is closed by an end bushing 77. It will be seen, therefore, that the bushing 77 and the piston face 75A and the wall of the bore 76 define a chamber 80 for the reception of pressure fluid to act on the piston 75 so as to tend to move the piston 75 rearwardly and thus similarly move the needle valve 70 to the end that fluid flow between the hydraulic chambers 56 and 60 becomes more restricted. It will also be seen from Fig. 1 that the rear end portion of the plug bore 76 and the rear piston face 75B define a chamber 81 for the reception of pressure fluid which when introduced therein would act upon the piston face 75B so as to tend to move the piston 75 forwardly and with it the needle valve 70. Such movement would withdraw the needle valve and thus reduce the metering effect thereof on fluid flow between the hydraulic fluid chambers 56 and 60.

As noted above a change in resistance to longitudinal movement of the tool element is also reflected in a change in the force exerted upon the fluid in the chamber 56 by the piston 65 since the piston 65 is adapted to be rigidly connected with the piston assembly 30, which mounts the chuck 24 and its tool element 25 by means of a cross arm 67 and the piston rod 66. This change of fluid pressure, too, is utilized to assist in effecting movement of the needle valve 70. For this purpose the reduced rear end portion of the piston 75 is received in a bore 82 formed coaxially in the plug 53 and its rear face 75C defines with the walls of the bore 82 a chamber which is maintained in continuous communication with the hydraulic fluid chamber 56 by a passage 84. The passage 84 extends longitudinally through the reduced forward end portion 54B of the tubular member 54.

During forward movement of the piston assembly 30 when the tool element is not in engagement with a workpiece or when resistance to such forward movement is at a minimum, it is desirable that such forward movement take place at a rapid rate. Therefore, the valve 70 should be fully open to permit comparatively unrestricted hydraulic fluid flow from the chamber 56 to the chamber 60. Referring particularly to the diagrammatic views, it will be seen that when the valve 40 is operated to supply live pressure from the inlet chamber 41 to the feed chamber 36 by way of the line 42 so that the tool is conditioned for forward movement, force is exerted by the piston 65 on the hydraulic fluid in the chamber 56 tending to force the fluid therefrom. By virtue of the communication afforded by the passage 84 between chamber 56 and the chamber 82, this force is exerted upon the face 75C of the valve operating piston 75, thereby tending to move the piston 75 and with it the valve 70 outwardly to minimize the metering effect of the valve 70 to fluid flow through the passage system 61, 62, 64, 63 to the chamber 60.

So that valve movement will be correlated with the resistance to forward movement encountered by the tool element 25, communication is provided between the feed chamber 36 and the face 75A of the valve operating piston 75 whereby such fluid pressure is also exerted against the piston 75, but in a direction opposite to the force exerted thereon by the hydraulic fluid in chamber 82 upon the piston face 75C. For this purpose communication is provided by way of interconnecting ports 85 between the chamber 80 and the feed chamber 38 of the tool with which it is used. It will be apparent therefore that a change in fluid pressure in the chamber 36 is immediately manifested in the chamber 80 so as to alter the position of the valve 70.

Thus, it will be apparent that with the tool in forward moving condition upon engagement of the tool element 25 with the workpiece, for example, there is an increase in the pressure in the feed chamber 36 due to the increased resistance to forward movement that obtains upon such engagement. This increase in fluid pressure operates on the face 75A of the piston 75 so as to move the piston rearwardly and thus tend to move the valve 70 so as to increase the restriction effected thereby reducing the fluid flow from the chamber 56 to the chamber 60. It will also be appreciated that at the same time that resistance to forward movement is increased there is a resulting decrease in rate of forward movement.

When it is desired to effect return movement of the piston assembly 30, chuck 24 and tool element 25, it is desirable that such return movement be effected at a rapid rate. As a result comparatively unrestricted fluid flow from the chamber 60 to the chamber 56 is desired. In order that this obtain, the chamber 81 is adapted to be connected to the return chamber 38 of the tool 20 so that when the valve 40 is operated to supply live pressure fluid from the inlet chamber 41 to the return chamber 38 by way of the line 44, the same fluid pressure operates upon the face 75B of the valve operating piston 75 to move the same forwardly, withdrawing the valve 70 so as to reduce the restriction afforded thereby to hydraulic fluid flow from the chamber 60 to the chamber 56. Such communication is afforded by way of the ports 86.

In order to force the hydraulic fluid from the chamber 60 to the chamber 56 by way of the passage system 63, 64, 62, 61, communication is provided between the fluid line 44 and the housing bore 52 behind the piston head 58B of the piston 58 by way of a port 88. Thus, whenever the valve 40 is operated to its return position (Fig. 3) live pressure acts on the piston face 58B to move it forwardly along the tubular member 54, thereby reducing the volume of the chamber 60. At the same time live pressure fluid supplied to the chamber 38 acts upon the piston 34 of the piston assembly 30 so as to withdraw the piston assembly and with it the chuck 24 and tool element 35. This return movement of the piston assembly also withdraws the piston 65 by virtue of the rigid connection of these two that is afforded by the cross arm 67. Withdrawal of the piston 65 correspondingly increases the volume of the chamber 56 so as to receive the hydraulic fluid that is being transferred upon the reduction of the volume in the chamber 60.

Referring more particularly to the diagrammatic views comprising Figs. 3, 4 and 5 of the drawings, the first of these figures shows the instant device applied to a pneumatic drilling tool and in condition both during return stroke and just prior to initiating a drilling cycle. It will be noted that live pressure fluid from the inlet chamber 41 of the valve 40 is supplied to the return chamber 38 of the tool and is thus holding the piston assembly 30 on returning the assembly to its rearmost position and with it the chuck 24 and the tool element 25 mounted therein and also the piston 65 are held in or returned to retracted position. At the same time, by virtue of the communication afforded between the fluid supply line 44 and the control piston chamber 81, the control piston 75 is held in its forward position, and the fluid reservoir piston 58 is in its forward position. With the piston 75 held in its forward position the metering valve 70 is also held forwardly thereby minimizing the metering effect thereof in the passage system 63, 64, 62, 61. So, too, it will be apparent that the control piston chamber 80 and the feed piston chamber 36 of the tool are open to the atmosphere by way of the fluid lines 42 and 43.

Forward movement of the piston assembly 30 so as to advance the tool element 25 toward the work is initiated by shifting the slide or valving element 45 into the position shown in Fig. 4. Upon so doing the fluid line 42 is connected to the inlet chamber 41 and the valve 40 and live pressure fluid is supplied by way of the line 42 to the chamber 36 and by way of the ports 85 to the control piston chamber 80. At the same time, the return piston chamber 38 of the tool 20 and the control piston chamber 81 of the feed control device and the portion of the housing bore 52 behind the piston 58 is connected so as to exhaust to the atmosphere by way of the ports 86 and 88, respectively, and the fluid line 44. With live pressure fluid admitted to the feed chamber 36 forward movement of the chuck assembly obtains. As a result, forward movement of the piston 65 also obtains and an expelling force is exerted on the hydraulic fluid in the chamber 56 which force is manifested in the chamber 82 and on the face 75C of the control piston 75. Since the valve 70 was fully withdrawn at the initiation of the forward stroke, and very little fluid force develops in chambers 36 and 80 until the tool element 25 contacts the work, the small force acting on face 75C of the control piston 75 together with that afforded by a biasing spring 90, which is interposed between the piston face 75B and the bottom of the bore 76 in the plug 53, serves to hold the valve 70 withdrawn to the end that substantially unrestricted flow of hydraulic fluid obtains from the chamber 56 into the chamber 60. Therefore, rapid advance of the tool element 25 toward the work obtains.

At the instant the tool element 25 contacts the work there is a sudden alteration of the rate of forward movement with the result that the force exerted by the piston 65 on the hydraulic fluid in the chamber 56 is suddenly reduced and correspondingly the force exerted by the hydraulic fluid upon the face 75C of the control piston 75 is suddenly reduced. At the same time there is a rapid increase of pressure in the feed piston chamber 36 and in the control piston chamber 80. This sudden increase causes an increase in the force exerted upon the face 75A of the piston 75. As a result the piston 75 is moved rearwardly and with it the valve 70 is moved rearwardly so as to restrict the flow of hydraulic fluid from the chamber 56 into the chamber 60. Restricting this flow of fluid raises the fluid pressure in the chamber 56 and correspondingly in the chamber 82 and thus against the face 75C of the control piston 75. It will be apparent, therefore, that inward movement of the piston 75 and the valve 70 continues until the force of the pressure fluid acting on the face 75A of the control piston balances the force exerted by the pressure fluid in the chamber 82 acting on the face 75C of the control piston 75 plus that force afforded by the biasing spring 90. This condition of balanced forces exists during the drilling operation. This condition of operation is indicated diagrammatically in Fig. 5 of the drawings. This self-balancing concept gives fast penetration with small drills, gives faster penetration with softer materials, or high speed with slower penetration with larger drills, or correspondingly, a slower speed within a range of medium feeds.

As a tool element such as a drill breaks through a workpiece, or the drill for some other reason encounters less resistance to forward movement, the force exerted by the piston 65 on the fluid in the chamber 56, and correspondingly the force exerted by the pressure fluid in the chamber 82 acting on the face 75C of the control piston 75, increases rapidly with the result that the control piston is moved outwardly and the valve 70 is withdrawn. When this condition obtains, rapid advance of the piston assembly 30, chuck 24, and the tool element 25, as shown in Fig. 4, is restored.

It is desirable that a manual adjustment be provided to limit the inner position of the valve 70 and thus limit the maximum restriction afforded thereby to the transfer of fluid through the passage system 61, 62, 64, 63. For this purpose the control piston 75 is provided with a forwardly projecting stem 92 having a threaded outer end portion for the accommodation of an adjusting nut 94. In the illustrative device the piston stem 92 mounts a sealing sleeve 92a, which serves to prevent leakage of pressure fluid from the chamber 80. The sealing sleeve is movable with the piston 75 axially within the end bushing 77 which serves to close the forward end of the bore 76 in the plug 53. It will be apparent that with the nut 94 being mounted upon and carried by the piston stem 92 its rear face is disposed for engagement with the forward face of the bushing 77 and serves to limit rearward movement of the piston 75 and thus of the valve 70.

When a heavy feed is desired the adjusting nut is screwed inwardly on the threaded stem 92, thereby limiting inward movement of the piston under the action of pressure fluid in the chamber 80 when it engages the outer face of the bushing 77. As a result the valve 70 is limited in its movement so as to restrict fluid flow in the passage system 61, 62, 64, 63. As a result a greater thrust force is transmitted to the tool element 25.

For a light feed the adjusting nut 94 is threaded outwardly away from the end bushing 77 so that during the drilling operation the balanced condition hereinbefore mentioned during drilling takes place with the valve 70 in a position increasing the restriction effected thereby of fluid flow through the passage system 61, 62, 64, 63.

It is desirable that the position of the adjusting nut 94 not be accidentally changed, or in other words, that the construction and arrangement require positive changing of the adjustment. For this purpose the instant device is equipped with an end cover 95 which, as shown, is mounted on the outer end of the end plug 53 adjacent the outer end of the housing 51 over the adjusting nut 94. The end cover 95 is equipped with a ball detent indicated generally at 96 which is engageable with notches 94a formed in the periphery of the nut 94. A shield 97 is mounted on the cover 95, and these two components are provided in their side walls with slots 97a and 95a which are adapted, upon rotation of the shield 97 with respect to the cover 95, to be brought into registry thereby permitting access to the adjusting nut 94.

From the foregoing it will be seen that a feed rate control device constructed in accordance with the teachings of the present invention is effective to automatically adjust the rate of longitudinal movement of the spindle of a tool with which it is utilized in accordance with the amount of resistance to such movement that is encountered by the tool. Further, the instant construction and arrangement permits of manufacture as an independent unit usable with any of a number of forms and sizes of reciprocatory pressure fluid operated tools requiring only mounting thereon and the effecting of a mechanical connection between its hydraulic piston and the reciprocating elements of the tool and fluid connections between it and the feed and return chambers of the tool.

I claim as my invention:

1. A feed rate control device for use with a pressure fluid operated tool having a rotary spindle for carrying a cutting element and a piston assembly including feed and return pistons respectively disposed in feed and return chambers for the action of pressure fluid thereon to effect longitudinal movement of the spindle, said device comprising, in combination, a housing, means rigid with said housing defining first, second, and third hydraulic chambers, a passage interconnecting the first and second chambers, and a port interconnecting the first and third chambers, said means also defining a cylinder, a control piston in said cylinder dividing the same into forward and rear pressure fluid chambers respectively adapted for connection to the feed and return chambers of the tool, said control piston also having a portion disposed in said third hydraulic chamber, a needle valve rigid with said control piston and extending into said passage for restricting hydraulic fluid flow therethrough, and an hydraulic piston adapted for rigid connection with the piston assembly of the tool and disposed in the first hydraulic chamber for altering the volume of said chamber according to the position of the piston assembly of the tool during movement thereof, fluid pressure in said forward chamber tending to move said control piston and valve toward a closed position of the latter, fluid pressure in said rear chamber and in said third hydraulic chamber tending to move said piston and said valve toward an open position of the latter, whereby the rate of longitudinal movement of the piston assembly and spindle of the tool can be correlated to the resistance to such movement encountered by the cutting element carried thereby.

2. A feed rate control device for use with a pressure fluid operated tool having a rotary spindle for carrying a cutting element and a piston assembly including feed and return pistons respectively disposed in feed and return chambers for the action of pressure fluid thereon to effect longitudinal movement of the spindle, said device comprising, in combination, means defining a closed hydraulic system including a pair of variable volume hydraulic fluid chambers having a fluid passage interconnecting the same, a needle valve interposed in said passage for restricting fluid flow therethrough, means adapted for connection with the piston assembly of the tool for varying the volume of said chambers, a control piston rigid with said valve for positioning the same, means defining a cylinder for the reception of said piston and defining therewith a first chamber for the reception of pressure fluid to move said control piston and valve toward a closed position of the latter, a second chamber for the reception of pressure fluid to move said control piston and valve toward an open position of the latter and defining a third chamber continuously communicating with one of said hydraulic fluid chambers to apply a corresponding force to said control piston in a direction to move said differential piston and valve toward an open position of the latter, said first and second chambers being respectively adapted for connection to the feed and return chambers of the tool, whereby the rate of longitudinal movement of the piston assembly of the tool can be correlated to the resistance to such movement encountered by the cutting element carried by the spindle.

3. A feed rate control device for use with a pressure fluid operated tool having a rotary spindle for carrying a cutting element and a piston assembly including feed and return pistons respectively disposed in feed and return chambers for the action of pressure fluid thereon to effect longitudinal movement of the spindle, said device comprising, in combination, means defining a closed hydraulic system including a pair of variable volume hydraulic fluid chambers having a fluid passage interconnecting the same, a needle valve interposed in said passage, means adapted for connection with the piston assembly of the tool for varying the volume of said chambers, and means including a differential piston responsive to fluid pressures in the feed and return chambers of the tool and to fluid pressure in one of said hydraulic fluid chambers for positioning said valve so as to control the flow of hydraulic fluid through said passage and thereby control the rate of longitudinal movement of the piston assembly of the tool in correlation to the resistance to such movement encountered by the cutting element carried by the spindle.

4. A feed rate control device for use with a pressure fluid operated tool having a rotary spindle for carrying a cutting element and a piston assembly including feed and return pistons respectively disposed in feed and return chambers for the action of pressure fluid thereon to effect longitudinal movement of the spindle, said device comprising, in combination: a housing adapted for mounting on the tool; a tubular member rigid with said housing in the rear end thereof defining a first hydraulic chamber coaxially within said housing; a first piston longitudinally movable upon said member and defining with said member and said housing a second hydraulic chamber; said housing having a passage therein interconnecting said first and second hydraulic chambers; a second piston adapted for rigid connection with the piston assembly of the tool and disposed in said first hydraulic chamber; a needle valve extending into said passage for restricting hydraulic fluid flow therethrough between said first and second hydraulic chambers; said housing also defining a cylinder adjacent the forward end thereof; a control piston rigid with said needle valve for positioning the same to control the amount of restriction afforded thereby to fluid flow through said passage between said first and second fluid chambers; said control piston being disposed in said cylinder dividing the same into forward and rear pressure fluid chambers respectively adapted for connection to the feed and return chambers of the tool; said control piston and said housing defining a third hydraulic chamber intermediate the ends of said housing having communication with said first hydraulic chamber; said first piston, said tubular member, and said housing defining a third pressure fluid chamber disposed on the opposite side of said first piston from said second hydraulic chamber; said third pressure fluid chamber being adapted for connection to the return chamber of the tool; fluid pressure in said forward chamber tending to move said control piston and said valve toward a closed position of the latter, fluid pressure in said rear chamber and in said third hydraulic chamber tending to move said piston and said valve toward an open position of the latter, and fluid pressure in said third pressure fluid chamber effecting movement of said first piston for varying the volume of said second hydraulic chamber so as to receive or expel hydraulic fluid therefrom in accordance with the direction of movement of said hydraulic piston; whereby the rate of longitudinal movement of the piston assembly and spindle of the tool can be correlated to the resistance to such movement encountered by the cutting element carried thereby.

5. A feed rate control device for use with a pressure fluid operated tool having a rotary spindle for carrying a cutting element and a piston assembly including feed and return pistons respectively disposed in feed and return chambers for the action of pressure fluid thereon to effect longitudinal movement of the spindle, said device comprising, in combination, a housing, means rigid with said housing defining first, second and third hydraulic chambers, a passage interconnecting the first and second chambers, and a port interconnecting the first and third chambers, said means also defining a cylinder, a control piston in said cylinder dividing the same into forward and rear pressure fluid chambers respectively adapted for connection to the feed and return chambers of the tool, said control piston also having a portion disposed in said third hydraulic chamber, a needle valve rigid with said control piston and extending into said passage for restricting hydraulic fluid flow therethrough, an hydraulic piston adapted for rigid connection with the piston assembly of the tool and disposed in the first hydraulic chamber for altering the volume of said chamber according to the position of the piston assembly of the tool during movement thereof, fluid pressure in said forward chamber tending to move said control piston and valve toward a closed position of the latter, fluid pressure in said rear chamber and in said third hydraulic chamber tending to move said piston and said valve toward an open position of the latter, whereby the rate of longitudinal movement of the piston assembly and spindle of the tool can be correlated to the resistance to such movement encountered by the cutting element carried thereby, and adjustable stop means interposed between said control piston and said housing for limiting movement of said control piston under the influence of fluid pressure in said forward chamber to limit the maximum movement of said piston and valve toward closed position of the latter.

6. A feed rate control device for use with a pressure fluid operated tool having a rotary spindle for mounting a cutting element and a piston assembly including feed and return pistons respectively disposed in feed and return chambers for the action of pressure fluid thereon to effect longitudinal movement of the spindle, said device comprising, in combination, means defining a closed hydraulic system including a pair of variable volume hydraulic fluid chambers having a fluid passage interconnecting the same, a valving element interposed in said passage, means adapted for connection with the piston assembly of the tool for varying the volume of said chambers, and means for positioning said valving element including a differential piston operatively connected to said valving element and responsive to fluid pressures in the feed and return chambers of the tool and to fluid pressure in one of said hydraulic fluid chambers and including spring biasing means for said differential piston adjustable to alter the rate of response thereof so as to control the rate of flow of hydraulic fluid through said passage between said hydraulic fluid chambers and thereby control the rate of longitudinal movement of the piston assembly of the tool in correlation to the resistance to such movement encountered by the cutting element carried by the spindle.

References Cited in the file of this patent

UNITED STATES PATENTS

| | | |
|---|---|---|
| 1,812,533 | Hunt | June 30, 1931 |
| 2,326,498 | Rodal | Aug. 10, 1943 |
| 2,604,759 | Smith | July 29, 1952 |
| 2,674,098 | Taylor | Apr. 6, 1954 |